INVENTORS
JOHN C. ABROMAVAGE
HARRY J. REICHARDT

BY Semmes & Semmes

ATTORNEYS

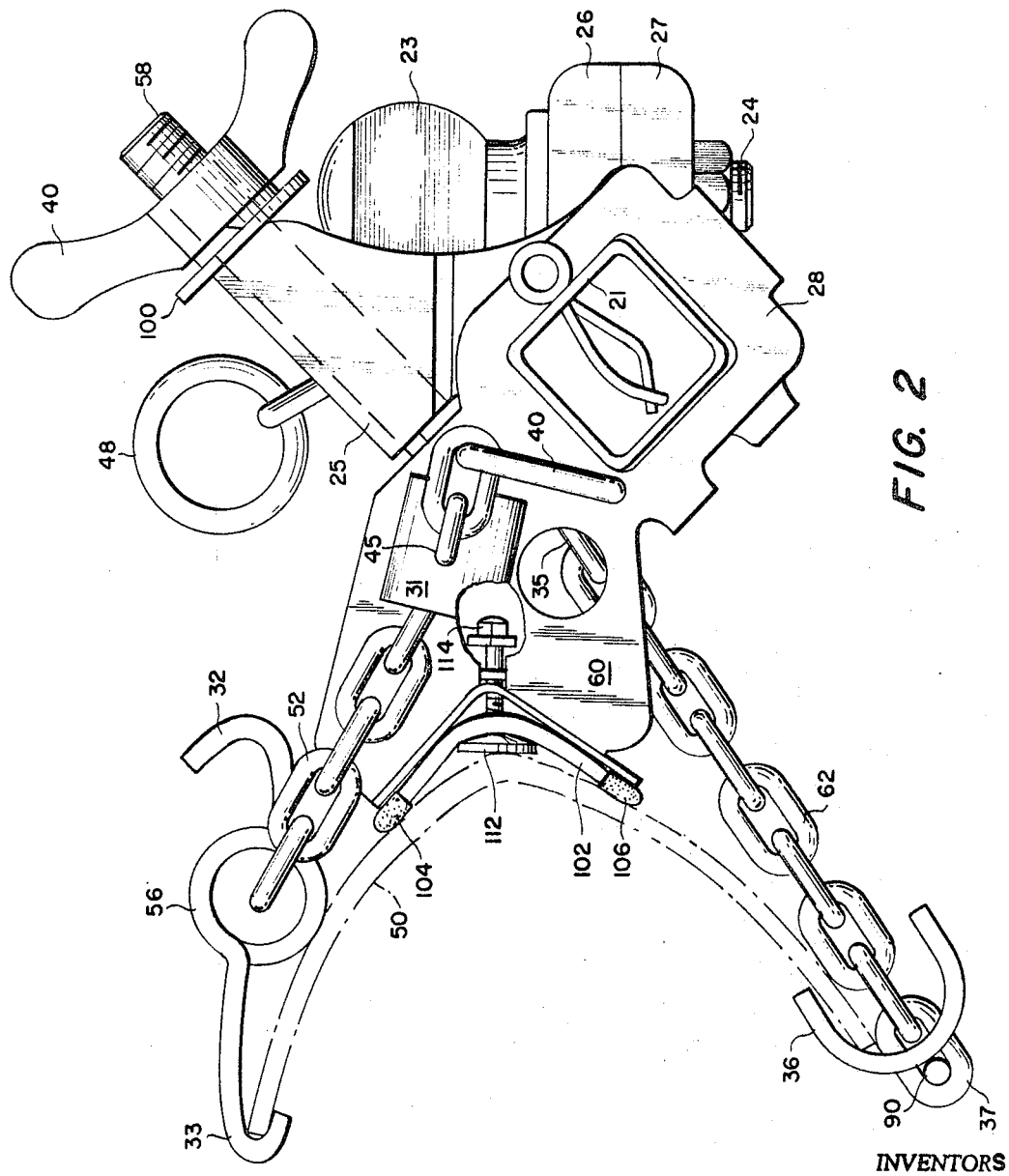

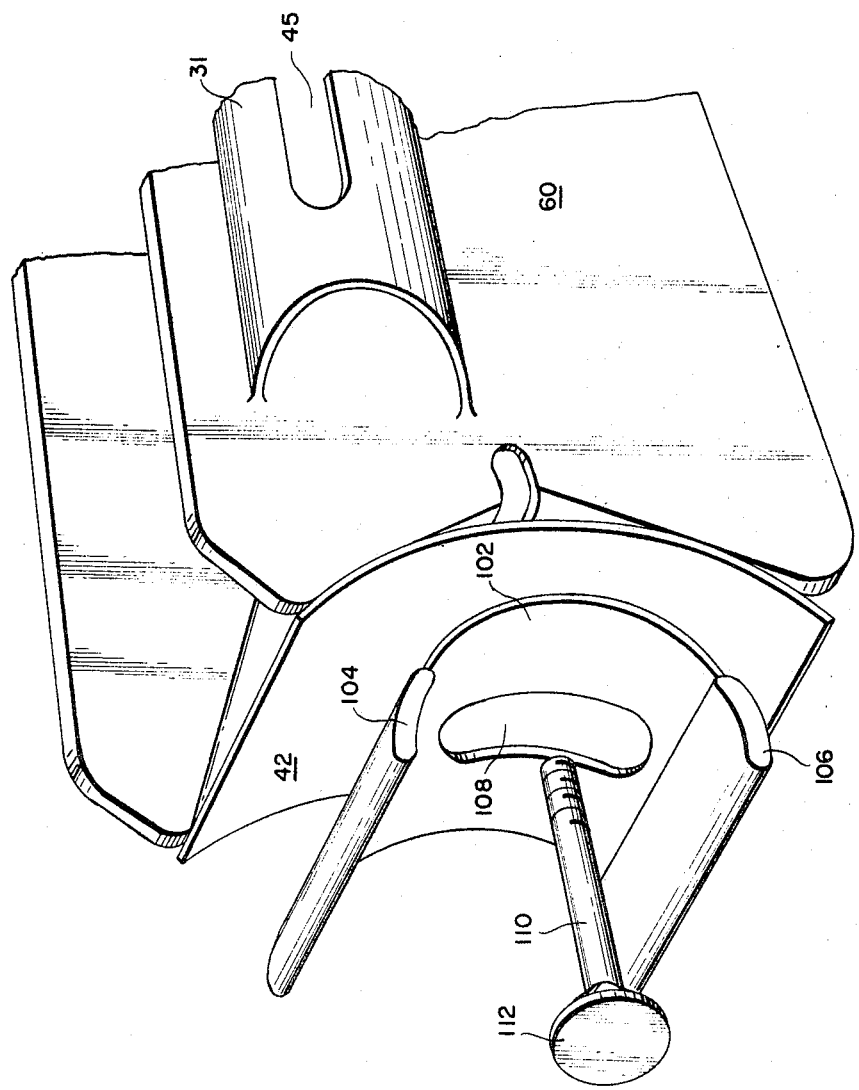

United States Patent Office 3,436,100
Patented Apr. 1, 1969

3,436,100
ARTICULATED BUMPER HITCH
John C. Abromavage, Jamison, and Harry J. Reichardt, Philadelphia, Pa., assignors to Arcoa, Incorporated, Portland, Oreg., a corporation of Oregon
Filed May 23, 1967, Ser. No. 640,703
Int. Cl. B60d 1/00, 1/06
U.S. Cl. 280—502                                     5 Claims

ABSTRACT OF THE DISCLOSURE

A bumper hitch assembly, particularly a temporary or "rental" hitch assembly which is easily fastenable to various types of automobile bumpers.

---

The present invention is an improvement over the invention described in Bumper Hitch Assembly (Patent 3,113,789), assigned to the assignee herein.

In Patent 3,113,789 the bumper hitch assembly includes a horizontal bar with ball socket or like hitch positioned upon said bar and separate bumper clasping elements adjustably positioned upon the horizontal bar at either side of said hitch. The bumper clasping elements included a housing, a separate bumper contact portion extending from the bar towards the bumper, a bumper top clasping chain and a bumper bottom clasping chain. The bumper bottom clasping chain is tightenable, so as to secure the entire bumper hitch assembly to any type of automobile bumper. According to 3,113,789 the horizontal bar was made vertically adjustable by the tightening of the lower bumper clamping chain so as to raise or lower the level of the horizontal bar with respect to the auto bumper, as desired. However, the bumper engaging portion simply included an angle iron segment with a webbed face roughly abutting the auto bumper curve. Vertical adjustability of the actual bumper engaging portion was not provided and there was no means for securely engaging the auto bumper curvature.

The present bumper hitch assembly constitutes an improvement in that the bumper engaging portion includes a curved articulated member adapted for abutting contact of the bumper curvature at reciprocal points. The curved articulated member is locked in a portion of vertical adjustability and its parallel ends are cushioned so as to provide a rigid, cushioned contact about the curvature of any type of auto bumper. As a consequence, the bumper hitch is ideally adapted for use in the rental industry wherein the rented vehicle or trailer is required to be secured to virtually every type of automobile bumper.

Accordingly, it is an object of invention to provide an adjustable bumper hitch assembly which can be secured to any type of automobile bumper.

Another object of invention is to provide a bumper hitch assembly wherein the bumper engaging portion is articulated and vertically adjustable.

Yet, additional objects of invention will become apparent from the ensuing specification and attached drawings wherein:

FIG. 2 is a side elevation, partially in section, and showing the assembly clamped upon the top and bottom of auto bumper.

FIG. 3 is an enlarged exploded view of the bumper engaging portion, showing the curved articulated member 102 and its locking pin 110 with respect to the housing.

Figure 1:
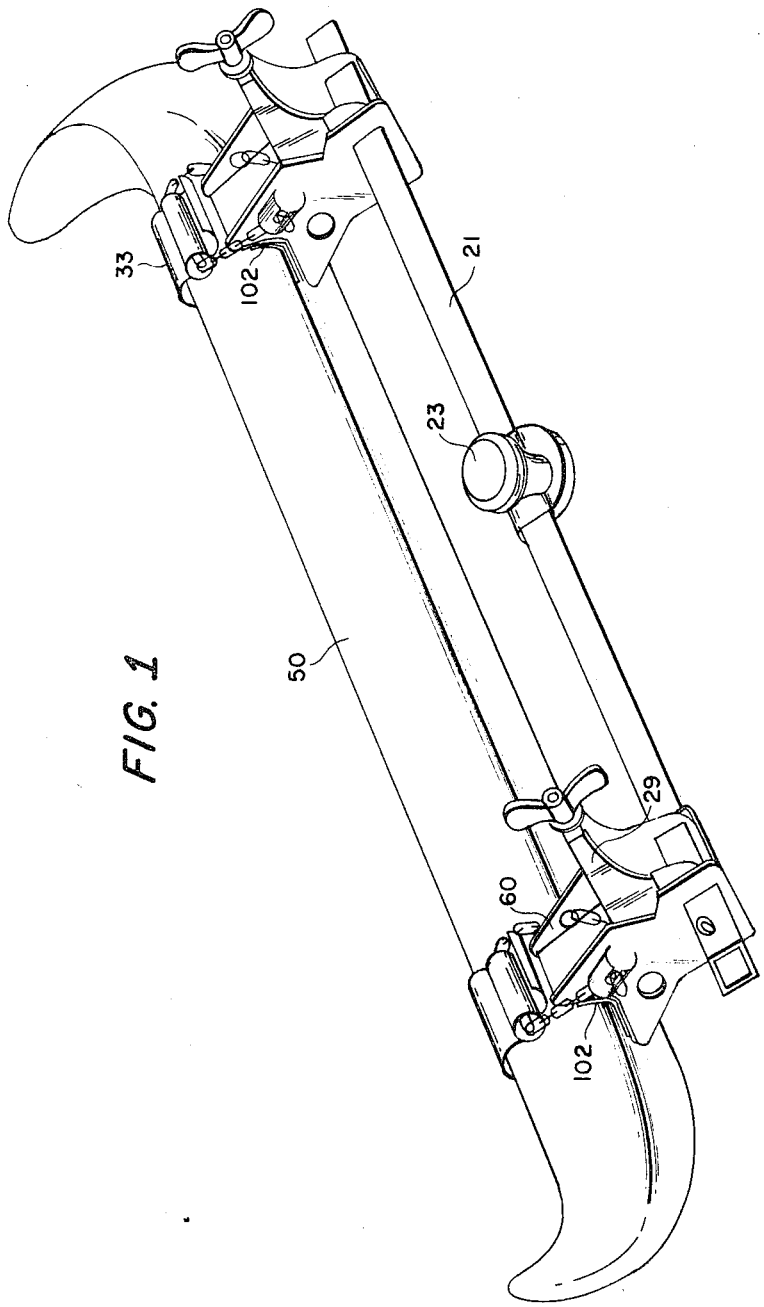
FIG. 1 is a perspective view of the bumper hitch assembly showing the bumper clamping elements positioned at opposite ends of the automobile bumper.

In FIG. 1 the bumper hitch assembly is shown comprising horizontal hitch bar 21 to which is attached ball socket or rounded piece 23 supporting hitch bolt 24 which extends through the brackets 26 and 27 by means of nut 25. As shown in FIGS. 1 and 2 hitch bracket pieces 26 and 27 extend substantially around hitch bar 21. Significantly, hitch bar 21 is diagonally positioned so that the trailer pulling and pushing forces are exerted principally on the stronger corner portions of the hitch bar, rather than on the flat side portions of the bar as in conventional hitch bar assemblies. The hitch bar housing also extends about the hitch bar 21 and includes a bumper abutting or outer portion 60 which extends towards the bumper exposed surface and an inner housing 29 through which extends threaded bolt 58. At the lower end of bolt 58 adjusting bolt lug plate 35 extends into outer portion 60. As illustrated in FIG. 2, both inner housing 29 and outer portion 60 independently encircle hitch bar 21. Wing-nut 40 may be positioned about bolt 58 and secured thereto by means of a spinner nut (not illustrated). Top bumper clasping chain 52 extends through and is secured in both sides of chain stop 31. Chain end rings 48 are provided for ease in handling of chain 52. Top chain 52 extends through tubular portion 56 of the universal clamp formed by the short radius top hook 32 and wide radius top hook 33. Either top hook 32 or top hooks 33 may be attached to the bumper top and then chain 52 tightened by locking in the notches 45 of chain stop 31. Lower bumper hook 36 is attached to lower chain 62 by means of lower hook connector 37 which is supported in a medial aperture in the base of the U-shaped hook 36 and engages retainer pin 90 traversing aperture 94 and fixed to hooks 36 by welding or the like. Lower chain 62 extends through bumper portion 60 and into a medial aperture in lug plate 35.

Lug plate 35 is actuatable towards and away from the bottom of the bumper by means of movement of wing-nut 40 upon bolt 58. The forward end of bumper engaging portion 60 may include an angular supporting surface 42, curved articulated bumper engaging member 102, and vertical locking pin 110 traversing medial aperture 108. Locking pin 110 having oversized head 112 is secured or locked to supporting surface 42 by means of tightening lock nut 114 within housing 60. Consequently, the bumper engaging portion 102 can be adapted to abut reciprocal sides of an outer bumper and provide a rigid fit of the entire assembly. As the device is moved to another type bumper lock nut 114 may be loosened and the curved articulated member re-positioned vertically in short order to the curvature of the bumper.

We claim:
1. A bumper hitch assembly comprising:
 (A) a horizontal bar,
 (B) a hitch medially positioned upon said bar, and
 (C) bumper clasping elements adjustably positioned upon said bar at either side of said hitch, said elements further including
  (i) a housing extending about said bar,
  (ii) a separate bumper contact portion extending from said bar towards the bumper, and having a curved articulated member adapted for abutting contact of a bumper curvature and being vertically adjustable upon a lock extending through said housing,
  (iii) bumper top clasping means extending from said bumper contact portion and bumper bottom clasping means extending from said housing to said bumper, and
  (iv) means tightening one of said clasping means, so as to secure said bumper contact portion against said bumper.

2. A bumper hitch assembly as in claim 1, said curved articulated member including parallel cushioned ends adapted for simultaneous contact of reciprocal portions of a bumper curvature.

3. A bumper hitch assembly as in claim 2, said curved articulated member including a lock nut means extending through its midportion and a complementary supporting surface so as to lock said nut in a condition of vertical adjustment.

4. A bumper clasping element mountable upon a horizontal bar supporting a hitch and comprising:
- (A) an inner housing extending around said bar,
- (B) an outer bumper engaging portion independently extending around said bar and from said bar towards the bumper, including:
  - (i) a curved articulated member adapted for abutting contact of a bumper curvature,
  - (ii) locking means extending through said curved articulated member and a complementary supporting surface so as to lock said member in a position of vertical adjustment,
- (C) a top chain extending from said bumper engaging portion towards said bumper,
- (D) a top bumper clasp attached to said top chain,
- (E) a bottom chain extending from said inner housing,
- (F) a bottom bumper clasp attached to said bottom chain,
- (G) a chain stop attached to said outer bumper engaging portion and engaging said top chain, and
- (H) a lug plate adjustably fitted in said inner housing and connected to a threaded bolt means supported in said inner housing and secured thereto by nut means, said bottom chain engaging said lug plate, and being tightened by turning of said nut upon said bolt.

5. A bumper clasping element as in claim 4, said curved articulated member including parallel cushioned ends adapted for simultaneous contact of reciprocal portions of a bumper curvature.

References Cited

UNITED STATES PATENTS 3,113,789   12/1963   Safford _____ 280—502

KENNETH H. BETTS, *Primary Examiner.*

ROBERT R. SONG, *Assistant Examiner.*